United States Patent [19]

Gracia et al.

[11] 3,807,305

[45] Apr. 30, 1974

[54] METAL PHOTOGRAPHIC PLATE COMPRISING A SILVER HALIDE PROCESS

[75] Inventors: Robert F. Gracia, Scituate; Richard A. Laughrey, Woburn; Paul F. Tuohey, Quincy, all of Mass.

[73] Assignee: Itek Corporation, Lexington, Mass.

[22] Filed: July 15, 1970

[21] Appl. No.: 55,238

Related U.S. Application Data

[63] Continuation-in-part of Ser. No. 744,631, July 15, 1968, abandoned.

[30] Foreign Application Priority Data

July 14, 1969 Great Britain .................... 35288/69

[52] U.S. Cl. ..................... 101/463, 101/465, 96/33, 96/48 PD

[51] Int. Cl. ............................................. G03f 7/02

[58] Field of Search ........ 96/1.5, 48, 86, 33, 48 PD; 101/463, 465

[56] References Cited

UNITED STATES PATENTS

| | | | |
|---|---|---|---|
| 3,573,041 | 3/1971 | Engeland et al. | 96/33 |
| 3,600,166 | 8/1971 | Sieg et al. | 96/33 |
| 3,581,661 | 5/1971 | Flechner | 96/33 |
| 3,615,442 | 10/1971 | Geris | 96/33 |
| 3,551,150 | 12/1970 | Woodward et al. | 96/33 |
| 3,490,906 | 1/1970 | Blake | 96/33 |
| 3,634,083 | 1/1972 | Berman | 96/35 |
| 3,674,489 | 7/1972 | Wyman | 96/48 PD |
| 3,425,830 | 2/1969 | Sanders | 96/1.5 |
| 3,471,288 | 10/1969 | Berman | 96/27 |
| 3,373,020 | 3/1968 | Tomanek | 96/1.5 |
| 3,449,705 | 6/1969 | Chamberlain | 96/1.5 X |
| 2,115,339 | 4/1938 | Mason | 96/86 |
| 2,766,119 | 10/1956 | Freedman et al. | 96/86 |
| 2,184,599 | 12/1939 | Jenny et al. | 96/86 |
| 3,511,178 | 5/1970 | Curtin | 96/33 |
| 3,481,271 | 12/1969 | Shimazu | 96/33 |
| 3,549,365 | 12/1970 | Thomas | 96/33 |

*Primary Examiner*—Norman G. Torchin
*Assistant Examiner*—Edward C. Kimlia
*Attorney, Agent, or Firm*—Homer O. Blair; Robert L. Nathans; W. Gary Goodson

[57] ABSTRACT

A metallic base photographic plate having images adherently and preferably conductively bonded to the metallic support is produced by exposing a copy medium comprising silver halide on a superficially roughened metallic support wherein the photoconductor is substantially photoconductively insulated from the metallic support, and contacting this copy medium with chemically reactive image-forming materials, such as a physical developer. A preferred process is one utilizing a copy medium capable of being rapidly processed and having a layer of a photoconductor-binder emulsion on a roughened metallic support and a physical developer capable of producing an image adherently and conductively bonded to the metallic support. The plate produced by this invention is useful as a printing plate, name plate, printed circuit and the like.

19 Claims, No Drawings

METAL PHOTOGRAPHIC PLATE COMPRISING A SILVER HALIDE PROCESS

This application is a continuation-in-part application of U.S. Ser. No. 744,631, filed July 15, 1968, now abandoned.

BACKGROUND OF THE INVENTION

1. Field of the Invention

This invention relates to metallic base photographic plates.

2. Description of the Prior Art

Metallic base photographic plates having a metal image adherently bonded thereto are particularly useful as nameplates and especially printing plates.

R. F. Reed, Offset Lithographic Plate Making, 1967, teaches a number of different commercial processes for producing metal plates for printing. Such processes are generally rather complicated and time-consuming. Exemplary of such a process is the "deep etch plate" which is prepared by exposing a metallic plate containing a coating of gum arabic and ammonium bichromate, developing the plate with special solution to dissolve the unhardened coating from the image areas, applying a special acid solution to etch away metal from the image areas, copperizing the image areas by an electroless plating bath or by an electrolytical method, applying a special lacquer and ink to the etched image areas, soaking the gum in the non-image areas and scrubbing it off from these areas, and finally applying a plate etch to desensitize these areas. Therefore, although the "deep etch plate" process produces high quality long run printing plates capable of producing printing runs of 100,000 copies or more, the cost of such plates is extremely high since these plates must be prepared manually by means of skilled labor. Although this process has been around for more than half a century, attempts to produce these high quality long run metal imaged metallic printing plates by substantially simplified and more economical procedures have failed.

The present invention provides a metallic base comprising a photosensitive silver halide having quality metallic images which are adherently and preferably conductively bonded to the metal support and can be used for making a long-run printing plate, a name plate, printed electrical circuit, or the like, as well as a process for preparation thereof which is rapid, simple and economical.

The metallic base photographic plates having images adherently and preferably conductively bonded to the metallic base are produced by photo-exposing the copy medium comprising a photosensitive silver halide and contacting the exposed medium with chemically reactive image-forming materials, such as by physical development. The copy medium useful in this invention comprises a photosensitive silver halide on a superficially roughened metallic support, and preferably the silver halide is carried in a binder on the metallic support. The photosensitive material is preferably insulated from the metallic base by means of a solvent-impermeable layer preferably of a thickness of at least 14 A units. The plate produced by this invention is useful as a printing plate, name plate, template, advertising plate, scale, printed circuit and the like. The imaged plate may be used after contacting with a photographic fixer. Preferably, however, the photosensitive layer and optionally the binder and/or insulating layer may be removed, as for example, by washing, thereby exposing an image adherently bound to the metal support.

When the imaged plate of this invention is used as a printing plate it is generally desirable to increase the oleophilic-hydrophilic deferentiation between the image areas and the non-image areas of the metal plate. This may be done, for example, to a silver image which is deposited on an aluminum support by contacting with materials such as mercaptans which will adhere to the silver image areas making them more oleophilic, alone, or in combination with phosphoric acid which adheres to the non-image areas thereby making the non-image areas more hydrophilic. Also a lithographic preparation containing a polymer such as gum arabic or carboxymethyl cellulose can be applied to improve the hydrophilic character of the non-image parts of the plate. Additionally, the printing life of the plate as well as the oleophilic character may be improved by coating the plate with lacquers which will adhere selectively to the image areas and not to the non-image areas. Other useful compounds for increasing the printing properties of this metal plate are disclosed in French Patent of Addition No. 77,556, herein incorporated by reference. A silver germ image or an amplified silver image may be made more oleophilic by amplifying in an ion solution of a metal which is more oleophilic than silver.

When the imaged plates are used as nameplates a colored developer may be used or a colored lacquer may be used which selectively adheres to the image areas. These plates may then be coated with an ordinary transparent coating, if desired.

In the present metallic base photographic media, the photosensitive silver halide is preferably incorporated in a binder and deposited in a very thin layer upon the superficially roughened metallic support, desirably to permit the silver halide to be deposited within the roughened surface of the support. This is readily accomplished with a solvent-binder solution of relatively low viscosity in which the silver halide is distributed by usual coating techniques. The coating is usually allowed to dry before photoexposure. The thus formed coating should preferably be solvent permeable to permit rapid photoprocessing in the subsequent development.

The roughened metallic support of this invention is a metallic support which has been physically, chemically, or otherwise roughened in order that the metallic image forming materials are adherently bonded to the support. Physically roughened supports which are suitable for this invention are ones having grained, porous, or matted surfaces. Chemically roughened supports are ones which have been treated by suitable acids or bases, adhesive primers, adhesives, and the like to cause chemical bonding to take place between the image forming materials and the surface of the support. Additionally, additives such as cadmium and/or zinc salts may be added to the image forming materials in a manner such as taught in French Patent of Addition No. 77,556 in order to improve the adhesion of the metal image to the metallic support. Also certain alloys, such as the manganese aluminum alloy (for example, containing 1 to 2% manganese), provide good adhesion for the deposited metal image. The term "roughened supports," therefore, is intended to include a physically smooth support which by chemical or other means provides an adhesive bond with the metal image deposited thereon.

The thickness of the photosensitive layer or the image-forming layer and the insulating layer will depend upon the nature of the photosensitive material, the nature of the binder, the amount of activating radiation utilized, and other like factors. However, in order to obtain an imaging medium capable of rapid processing it is preferred that these layers be relatively thin, preferably less than about 2 microns in thickness. However, the thickness of the photoconductorbinder layer and the insulating layer may vary within wide ranges. Most preferably, the coating is less than 1 micron in thickness in order to obtain rapid processing which is most desired.

In general the amount of binder to amount of photosensitive material may vary over wide ranges. Preferably, from about 1 part by weight to about 6 parts by weight of photosensitive material per part by weight of binder will be used. However, if desired the binder may be omitted.

In the embodiment wherein the photosensitive material is immersed in the roughened surface of a metallic support, the photosensitive material is separated from the metal of the support by a binder in which the material is dispersed, a separate insulating layer such as a silicate layer, or metal oxide of the metal of the support.

The insulating layer is preferably a solvent impermeable layer of at least 14 A in thickness and more preferably from about 20 to about 30 A in thickness. When the insulating layer is at least 20 to 30 A in thickness, the development latitude is greatly increased, i.e., concentration of the developer, e.g., the metal ions, may be increased above the optimum without getting significant background fog. An especially preferred insulating layer is one produced by oxidizing the surface of the metallic substrate. This barrier oxide layer can be produced by anodizing techniques, mild electrical treatment, heating in an oxidizing atmosphere, or by treating with acids such as nitric acid or other strong oxidizing agent. A preferred system of producing such an oxidized metal surface is by first degreasing the metal such as aluminum with alkali or soap, then graining the metal substrate, as for example, by brush graining by means of nylon brushes, then washing the metal substrate, then applying an oxide layer by a method such as mentioned above, then applying the photosensitive coating, and finally drying the coated substrate. Preferably, the operation is done in line from coil metal. When coil metal is utilized a cutter is provided at some point in the operation, preferably at the end to cut the coated substrate into desired sizes.

A most preferred substrate is an aluminum support having a barrier oxide, e.g., aluminum oxide, layer of at least 14 A in thickness and most preferably from about 100 to about 200 A in thickness in order to obtain a long wearing printing surface. See commonly owned co-pending application, U.S. Ser. No. 42,563, filed June 1, 1970, now abandoned.

A further advantage of the use of a layer of photosensitive material in a binder resides in a further preferred mode of the invention, i.e., the removal of the photosensitive layer after formation of the adherently bonded metal image.

The removal of the photosensitive layer can comprise the photosensitive material either alone or in combination with binder materials. The photosensitive material is preferably used in a binder to form the photosensitve layer on the support, the sole requirement being that the layer be removable after photoprocessing. For removal, various methods can be used including dissolution or dispersion of the photosensitive layer using suitable liquid systems, such as solvents for the binder employed. Alternatively, removal of this layer with reactive solvents such as alkali or acid can be used, e.g., aqueous sodium carbonate, dilute sodium hydroxide, dilute phosphoric acid, phosphate salts and similar reagents. Mechanical removal of the photosensitive layer can be employed, e.g., using abrasive materials. Combinations of these methods can be used, e.g., rubbing the photosensitive layer from the support in the presence of a binder solvent or dispersing agent such as water.

Preferably, for convenience the binder should be removable with aqueous systems. When not so removable, then suitable solvents which will dissolve or disperse the binder should be used. Little difficulty is encountered in selecting an appropriate solvent system since a simple solubility test can be used for the said purpose by merely immersing test media consisting of the support coated with the selected binder in various solvent systems. Solubility data for most binders are usually provided in standard texts or otherwise available. For example, methyl ethyl ketone, methyl isobutyl ketone, acetone, tetrahydrofuran, dioxane, and similar polymer solvents will be useful.

To obtain metal images according to this invention, the binder should not be removable by the photoprocessing conditions, i.e., the photosensitive layer should remain substantially intact during solution processing. However, if desired, binders which would dissolve in the processing solution during processing can be employed if viscous processing materials are employed, thus avoiding any substantial dissolution of the binder.

Any photosensitive silver halide system can be employed in the present media, provided that such system be developable as hereindescribed. Any form of irradiation commonly employed in silver halide photography can be used in the photoexposure step and is referred to herein as activating radiation.

The metallic support of the imaging medium of this invention comprises any suitable metallic or substantially metallic backing of sufficient strength and durability to satisfactorily serve as a reproduction carrier. The support may be in any form such as, for example, sheets, ribbons, rolls, etc. This sheet may be made of any suitable metal or their alloys, as for example, the hydrophilic metals such as chromium, nickel, lead, stainless steel, magnesium, or aluminum; or the oleophilic metals such as copper or zinc. Aluminum is preferred because of its desirable physical and chemical properties, as well as its economy. A porous anodized surface is especially preferred for the aluminum support. The anodized surface may be sealed by heating. However, the unsealed surface is preferred because of the improved adhesion that can be obtained between the metal image and the aluminum support.

It may be desirable to use a binder agent to bind the photosensitive material to the base sheet to aid in improved physical development, or to use a separate insulating layer. In general, these binders are translucent or transparent so as not to interfere with transmission of light therethrough. They are desirably also solvent permeable in order to allow rapid physical development to take place. Preferred binder materials are organic materials such as natural or synthetic polymers. Examples of suitable synthetic polymers are butadiene-styrene copolymer, poly (alkyl acrylates) such as poly (methyl methacrylate) polyamides, polyvinyl acetate, polyvinyl alcohol and polyvinylpyrrolidone. Natural polymers such as gelatin are also useful. Most preferred are those binders which are solvent soluble enough to be readily washed off after development of the image has taken place.

The period of exposure to form the latent image will depend upon the intensity of the light source, particular photosensitive material, and like factors known to the art. In general, however, the exposure may vary from about 0.001 seconds to several minutes.

As mentioned hereinbefore, the adherent metal image is formed by contacting the photoexposed medium with chemically reactive image-forming materials, or physical developers. These image-forming materials or physical developers preferably include an oxidizing agent and a reducing agent, are often referred to in the art as electroless plating baths, and are described in U.S. Pat. Nos. 3,152,903 and 3,390,988 and in British Pat. Nos. 1,043,250 and 1,064,725. Electrolytic development such as described in U.S. Pat. No. 3,152,969 can also be used. The oxidizing agent is usually the image-forming material, but not always. The oxidizing agent and reducing agent can be combined in a single processing bath or may be in a separate bath. Further, one or both of the oxidizing and reducing agents can be incorporated in the imaging medium prior to exposure. The preferred oxidizing agents comprise the reducible metal ions having at least the oxidizing power of cupric ion and include such metal ions as $Ag^{+}$, $Hg^{+2}$, $Pb^{+4}$, $Au^{+1}$, $Au^{+3}$, $Pt^{+2}$, $Pt^{+4}$, $Ni^{+2}$, $Sn^{+2}$, $Pb^{+2}$, $Cu^{+1}$ and $Cu^{+2}$.

A suitable source of silver ion is the unexposed silver halide of the medium which can be dissolved by use of silver halide solvents. Thus, a suitable physical developer can comprise a silver halide solvent and a reducing agent for silver ions. Silver halide solvents are well known in the photographic art and include any substance which will dissolve the unexposed silver halide of the photosensitive layer to form a solution thereof which functions as an amplifying agent for the latent image formed by the photoexposed silver halide. Commonly employed as silver halide solvents are soluble thiosulfate and thiocyanate salts, but any compound capable of dissolving silver halide, usually by complex ion formation, can be used for the same purpose as long as the complex ion formed is not of a high order of stability, i.e., not appreciably dissociated.

The reducing agent component of the said image-forming materials are inorganic compounds such as the oxalates, formates, and ethylenediaminetetraacetate complexes of metals having variable valence; and organic compounds such as dihydroxybenzenes, aminophenols, and aminoanilines. Also, polyvinylpyrrolidone, hydrazine, and ascorbic acid may be used as reducing agents in this invention. Suitable specific reducing compounds include hydroquinone or derivatives thereof, o- and p-aminophenol, p-methylaminophenol sulfate, p-hydroxyphenyl glycine, o- and p-phenylenediamine, 1-phenyl-3-pyrazolidone, alkali and alkaline earth metal oxalates and formates.

Liquid physical developer systems are preferred for use as image-forming materials because of the excellent results obtained therewith. Any suitable solvent may be utilized. However, aqueous processing baths are preferred. While the pH of the developer is not critical, it has been found that with metal base media the best results are obtained with an acid developer, and especially one having a pH of between about 2 and 5, and especially with organic acids such as citric, gluconic, maleic, and oxalic which are metal complexing agents. A pH of about 2 to 3 is especially preferred. It is believed that the acid functions by dissolving the oxide layer on a metal such as aluminum, therefore improving the adhesion and conductivity of the image to the metallic support.

Additionally, the image-forming materials or physical developers may contain organic acids or alkali metal salts thereof, which can react with metal ions to form complex metal anions. Further, the developers may contain other complexing agents and the like to improve image formation and other properties found to be desirable in this art.

Additional developer systems useful in this invention are those disclosed in the U.S. Pat. Application Ser. No. 743,982, now abandoned and U.S. Pat. Nos. 3,674,489 and 3,654,736 each of which are incorporated herein by reference.

The physical developers of this invention should be applied for a length of time sufficient to obtain an image adherently, and preferably conductively, bound to the metallic support. This time period will vary according to the thickness of the photoconductor layer or thickness of the insulating layer or other separation layers, the length of exposure, nature of the binder or insulator material, ratio of photosensitive material to binder, and like factors known to the art.

After completing the developing process, should the metal image not be adherently, and preferably conductively, bound to the metal plate, the development step can be repeated using the aforementioned physical developers, or alternatively, by amplification with metals such as copper using known techniques, e.g., electroplating, electroless plating, and the like.

A useful plating bath for amplifying a metallic image which is conductively bonded to a metal support is the one comprising a metal ion and a pickling agent for the metal of the metallic support, e.g., a solution of copper ethylenediaminetetraacetic acid (CuEDTA) and sodium EDTA. Such a system is also useful in identifying metal images which are conductively bound to the metallic support.

A distinct advantage of the present process resides in the stable latent images formed in the photosensitive layer which is an important asset in multiple photoexposure of a single photographic medium, a procedure commonly employed in commercial lithographic plate making. In such a process, sections of the medium are exposed successively and the entire medium is then developed. Thus, the initial latent images should not undergo any appreciable extent of decay lest the sensitometric characteristics of the resulting metal image differ from those of the last-form latent image. This stability of the latent images is exhibited by the present media which, after remaining for long periods prior to development, apparently undergo no noticeable decay which indicates, from a practical viewpoint, an almost indefinite stability of the latent image.

While this application generally describes a negative working (i.e., negative to positive or visa versa) photographic process, it should be understood that the process applies equally well to positive working processes.

The metal image of this invention is a coherent metal as opposed to the particulate metal of most photographic images. Furthermore, these images are adherently bonded to the support. The type of image metal plus the bonding to the support gives the plate the capability of being used on a conventional offset lithographic printing press under ordinary operating conditions to produce at least 5,000 inked paper prints, and more preferably at least 100,000 without showing any significant loss in print quality.

A process according to this invention for making inked printing plates and using these plates for printing which comprises contacting an imaging medium comprising a physically developable image with a metal image-forming material for a period of time sufficient to produce a coherent, conductive metal image adherently bonded to the medium; contacting the surface of the imaged medium with a printing ink which selectively adheres to the image or non-image areas; and, contacting the inked medium with a receptor sheet for said ink. Preferably a lithographic printing process is used treating the surface of the imaged medium with an aqueous fountain solution, and may be used on a lithographic press without the fountain solution to print by driography. In driographic printing the non-image areas of the plate are made to reject oleo ink, e.g. by coating with a polysiloxane elastomeric polymer, with a printing ink having an oleophilic binding agent, whereby, said ink adheres to the areas of the surface corresponding to the physically developable image, and using said ink imaging medium to print by driography.

This invention above described is exemplified as follows:

EXAMPLE 1

A brush grained anodized aluminum sheet material of about 0.009 inch thickness is partially coated with a water-permeable gelatin layer and then coated with a gelatin-silver halide emulsion to a dry thickness of about 1 micron. The plate is then exposed through a negative and developed in a standard metol silver halide developer containing 20 g/l of sodium thiosulfate.

The silver image produced is adherently and conductively bound to the aluminum support.

This procedure is repeated but the pre-coating with gelatin of the aluminum sheet is omitted. The resulting silver image is substantially identical with that obtained using the gelatin pre-coating.

In both cases, the silver image is subjected to vigorous abrasion with a rubber pencil eraser with no apparent change. When subjected to the Scotch Tape test, i.e., Scotch Tape is applied across the image areas and then ripped off vigorously, the image is visibly unaffected. Both of these tests indicate that the silver metal image is adherently attached to the aluminum plate.

An ohmmeter is used to test the conductance of the image and non-image areas with reference to the support sheet and the image areas show much greater conductance, thus demonstrating that the image is conductively bound to the aluminum support.

In comparison, the foregoing procedure of forming a silver metal image is repeated but merely using a standard silver halide Metol developer but without a silver halide solvent, i.e., the developer is not a physical developer, and the silver image produced is not adherently or conductively bound to the aluminum support, with or without the gelatin precoating of the metal plate.

The adherent and conductively-bound silver image-bearing plate are converted to printing plates by treating with a copperizing solution comprising:

Solution I

| | |
|---|---|
| $CuSO_4 \cdot 5H_2O$ | 40 g. |
| $H_2O$ | 240 g. |
| 28% $NH_4OH$ | 63 ml. |
| Solution II | |
| Sodium sulfoxylate formaldehyde | 20 g. |
| $H_2O$ | 50 g. |

Just prior to use, Solutions I and II are mixed and the plate immersed therein for 3–5 minutes. The result of this treatment is copper plating of the silver image only. The plate is then treated with dilute phosphoric acid and finally inked with rub-up ink. Good continuous tone and half tone prints are produced.

Alternatively, the silver-imaged plate is immersed in the following copperizing solution:

| | |
|---|---|
| $CuSO_4$ | 0.5 mole |
| Sodium ethylenediamine tetraacetate ($Na_4EDTA$) | 1 mole |
| $H_2O$ | to one liter |

at 55°C. to obtain a dense copper image adherently bonded to the aluminum support after 30 seconds.

EXAMPLE 2

Silver chloride emulsions are prepared by mixing the following components in a sonifier for 4-5 minutes:

| Component A | |
|---|---|
| NaCl | 0.5 g. |
| $H_2O$ | 50 ml. |
| 10% solution of Polyvinyl alcohol | 2.0 g. |
| Component B | |
| 3 N. $AgNO_3$ solution | 3.0 ml. |
| $H_2O$ | 50.0 ml. |
| 10% solution of polyvinyl alcohol | 2.0 g. |

The emulsion is then coated on brush grained, anodized aluminum sheet and exposed for 15 sec. through a negative using a 650 watt quartz-iodide lamp, after which the medium is immersed in a developer composed of a mixture of the following solutions:

| Solution A | |
|---|---|
| 3 N $AgNO_3$ | 15 ml. |
| Solution B | |
| Metol | 30 g. |
| citric acid | 80 g. |
| $H_2O$ | to one liter |

After the image is developed to a high density, the applied coating is removed by washing under water to leave an adherent silver image on the aluminum plate.

In this example, the amount of silver halide employed is very small and the silver halide functions as an image sensor. Substantially all of the image silver is derived from the developer system used.

The imaged medium (prior to development) showed an almost indefinite latent image stability. In one modification, a step and repeat plate is prepared with 16 hours between photoexposures and no sensitometric changes are noted. This step and repeat involves photoexposing one section of the photographic medium at a time without intermediate development to the visible silver image and, after all photoexposures are completed, the medium is then developed with no apparent difference in the sensitometric properties of the images thus obtained, thus showing a high order, if not indefinite, latent image stability. Such a high order of latent image stability is not exhibited by other photosensitive materials, e.g., photoconductors, or photosensitive ferric compounds, in which there are some sensitometric changes noted in the step and repeat process described.

EXAMPLE 3

A roughened aluminum sheet is coated and processed as described in Example 1 to produce adherently bound silver images on the roughened support. However, the image areas are subjected to the additional treatment:

1. Coat with Durolith-D-250 lacquer or any other similar lacquer which adheres to oleophilic surfaces in preference to hydrophilic surfaces.
2. Spray or coat with a clear ordinary coating lacquer and dry.

The imaged aluminum sheet thus processed is suitable for label or any similar metal decorating application. By omitting the step of coating with a clear, ordinary coating lacquer, the thus lacquered support is useful as a printing plate.

A brush grained or matted steel support is used in this example in place of the aluminum support to obtain similar results.

EXAMPLE 4

An unsealed, porous, anodized aluminum sheet which is made of an aluminum alloy having 1.5% of manganese is coated and exposed as described in Example 1 and processed with the following viscous solutions:

Viscous Sensitizer

| | | |
|---|---|---|
| $AgNO_3$ | 255 | gms. |
| (Hercules Powder) Klycel H.A (thickening agent) | 15 | |
| to a liter with water | | |
| Viscous Developer | | |
| Metol | 33.6 | gms. |
| Diethylaminoethanethiol HCl | 1.0 | gms. |
| Citric Acid | 5.0 | gms. |
| Pectin | 30.0 | gms. |

The viscous solutions are applied with a 0.0015 inch Gardner applicator. The viscous coating is removed from the surface to show a silver image which is adherently and conductively bound to the aluminum support. The thus-imaged sheet is utilized as a printing plate by processing as in Example 1.

EXAMPLE 5

A brush grained aluminum foil or sheet is coated, exposed and developed as explained in Example 1 to produce an aluminum plate with a silver image adherently bound to the grained aluminum foil. However, the plate is not treated with a copperizing solution. The deposited silver image is instead treated with the following dispersion:

| | |
|---|---|
| 2-Mercaptobenzothiazole | 1.0 gms. |
| 85% $H_3PO_4$ | 1.0 gms. |
| Water | 80.0 gms. |

The dispersion is wiped on the plate with a cotton swab. The plate is now used on an offset press. The silver image itself will now accept the greasy printing ink and the non-exposed background areas accept water.

EXAMPLE 6

A 5% solution of polyvinyl alcohol (PVOH) is prepared by slowly adding the resin powder to distilled water at room temperature with rapid stirring. The temperature is slowly raised to 95° C. while maintaining rapid agitation, and held at 95° C. for about 0.5 hour.

The following solutions are prepared using the 5% PVOH solution thus prepared:

| Solution A | | Solution B | |
|---|---|---|---|
| Distilled $H_2O$ | 84.0 | Distilled $H_2O$ | 84.0 |
| 10% aq. NaCl | 30.9 | 10% aq. $AgNO_3$ | 81.5 |
| 5% PVOH | 14.0 | 5% PVOH | 14.0 |

(Solution B is not prepared until immediately before the described use, i.e., freshly prepared before mixing with Solution A.) Solution A is added to Solution B under good agitation within about 5 seconds total addition time, at room temperature. The mixture is then sonified (Bronson Sonifier) for 4 minutes at about 100 watts. Then, 248 parts of 5% PVOH solution is added to the mixture under good agitation and agitation is continued for about 5 minutes thereafter. Subsequently, the mixture is filtered through a five micron bag to obtain an emulsion of the following characteristics:

| Emulsion Constants: |
|---|
| 1:2 parts by weight of silver chloride to PVOH |
| 10% excess chloride |
| 4.5% total solids |
| 12.4 g. silver chloride/liter |
| pH = 5.9 to 6.2 |
| viscosity = 6 to 8 cps |

The emulsion can then be coated on a substrate by either air knife, roller coating or similar coating means. Good results are obtained using a roller coater with hard rubber rolls. With proper settings, a coating weight of 0.5 g./m² can readily be obtained.

A grained anodized aluminum plate having a barrier oxide layer of about 100 A is so coated and thoroughly dried by heating at about 27°C for 10 minutes. The coated film is then exposed and developed in the following stabilized physical developer:

| | | | |
|---|---|---|---|
| Solution I | Ferrous Ammonium Sulfate | 78.4 gms. | bring to 1 |
| | Ferric Nitrate | 32.3 gms. | liter with |
| | Citric Acid | 80.0 gms. | distilled water |
| Solution II | Distilled Water | 100.0 gms. | |
| | Synthrapol N | 1.0 gms. | |
| | Armac 12D | 1.0 gms. | |
| Developer | Solution I | 125.0 gms. | |
| | Solution II | 25.0 gms. | |
| | 3N Silver Nitrate | 6.0 gms. | |

A lustrous, coherent, metallic image is obtained on the plate after about two minutes of development.

The resulting plate is then wiped with a dispersion of mercaptobenzothiazole (e.g.) phosphoric acid (5 ml. 85%) and dodecylammonium chloride (0.5 g.) in one liter of water. The silver image will now accept lacquer or ink depending on whether it is to be used as a color image (by inclusion of color in the lacquer) or as a printing plate.

The metal image is adherently bonded to the aluminum substrate.

In all of the foregoing examples, the metal image formed on development is a continuous metal image, as contrasted to the normal particulate metal image usually obtained in photographic development. The continuous metal image is formed of large contiguous particles of the metal which gives the appearance of a continuous layer. The image is characteristically lustrous, e.g., the silver images are lustrous, which is the preferred form of the metal for the contemplated uses, e.g., printing plates, as contrasted with fine, particulate, black, metal deposits characteristic of most photographic metal images, e.g., the black deposits of silver metal in silver halide photography, which are generally not electrically conductive.

When used in the production of printed electrical circuits, the present media after development, and preferably after removal of the photosensitive layer, can be treated to obtain the electrical circuit by chemical removal of the metal circuit formed on the metal support. Any reagent which will attack the support but be inert to the image metal can be used to separate the metal circuit, e.g., with silver or copper images on aluminum support, alkali such as dilute sodium hydroxide, or acids, such as dilute sulfuric acid. Additional reagents for this purpose will suggest themselves to those skilled in the art. If desired, the metal circuit can first be imbedded in a suitable support before removal from the aluminum support and the circuit in suitable support is removed from the aluminum support by dissolving away the aluminum chemically.

What is claimed is:

1. Process of printing consisting essentially of:

a. exposing a copy medium comprising a thin photosensitive silver halide layer on a roughened metal support to form a physically developable image in said layer;

b. physically developing by contacting said medium with image forming materials comprising a source of metal ions and wherein the thickness of the physically developable image, the roughness of the support, the proximity of the physically developable image with respect to the surface of the support, and the length of contacting of said medium with said image forming materials being such as to thereby form a coherent metal image in said photosensitive layer which is adherently bonded and in intimate contact with said support;

c. contacting said metal image of the surface of the metal imaged medium with printing ink which selectively adheres in an image pattern to the imaged medium; and d. transferring the image pattern of ink onto a receptor sheet for said ink to produce prints of the original image.

2. Process as in claim 1 wherein the photosensitive layer comprises a silver halide in a solvent permeable binder.

3. Process as in claim 1 wherein the metal ions comprise silver ions or copper ions.

4. Process as in claim 1 wherein subsequent to step (b) and prior to step (c), the step of increasing the oleophilicity of the metal image.

5. Process as in claim 1 wherein the silver halide layer has a coating weight of about 0.5 grams per square meter.

6. Process as in claim 1 wherein the metal of the metallic support is aluminum and wherein the insulating layer is aluminum oxide having a thickness of at least 100A.

7. Process as in claim 1 wherein the silver halide is deposited in a solvent permeable binder and wherein the silver halide is present in an amount between about 1 part by weight and about 6 parts by weight of silver halide per part of binder.

8. Process as in claim 7 wherein the metal ion of the image forming materials is silver ion.

9. Process as in claim 6 wherein the aluminum support is brushed grained and wherein the imaged support produced in step (e) is capable of being used on a conventional offset lithographic press under ordinary operating conditions to produce at least 100,000 inked paper prints.

10. Process of printing comprising:

a. forming a physically developable image in a photosensitive silver halide layer of a copy medium comprising said photosensitive layer on a roughened metal support, the thickness of the photosensitive layer being less than about 2 microns;

b. physically developing by contacting said medium with image forming materials comprising a source of metal ions for a period of time sufficient to produce a coherent, metal image adherently bonded to the medium and capable of being used on a conventional offset lithographic press under ordinary operating conditions to produce inked paper prints;

c. contacting the surface of said imaged medium with printing ink which selectively adheres in an image pattern to the imaged medium; and d. transferring the image pattern of ink onto a receptor sheet for said ink to produce prints of the original image.

11. Process as in claim 10 wherein the printing process is carried out by lithography on a lithographic press.

12. Process as in claim 10 wherein subsequent to step (b) and prior to step (c), the step of increasing the oleophilicity of the metal image.

13. Process as in claim 12 wherein the step of increasing the oleophilicity of the metal image comprises contacting with a bath selected from the group consisting of a copperizing bath, a mercaptan compound-containing bath, an oleophilic lacquer solution and a bath containing a mercaptan compound and phosphoric acid.

14. Process as in claim 10 wherein the silver halide is silver chloride having an excess of chloride content.

15. Process as in claim 14 wherein the image forming materials additionally comprise a chemical reducing agent for said metal ions.

16. Process as in claim 15 wherein the metal ions comprise silver ions.

17. Process as in claim 10 wherein the support is a metal support, the surface of which has been physically roughened and contains an insulating layer between the photosensitive layer and the metal of the support.

18. Process as in claim 17 wherein the metal of the support is aluminum and wherein the insulating layer is a solvent impermeable aluminum oxide layer having a thickness of between about 100 and 200A and wherein the imaged support produced in step (b) is capable of being used on a conventional offset lithographic press under ordinary operating conditions to produce at least 100,000 inked paper prints.

19. Process as in claim 18 wherein the image forming materials comprise a stabilized physical developer comprising silver ions, a chemical reducing agent, and an ionic surfactant as a stabilizing agent.

* * * * *

UNITED STATES PATENT OFFICE

CERTIFICATE OF CORRECTION

Patent No. 3,807,305 Dated April 30, 1974

Inventor(s) Robert F. Gracia, et al

It is certified that error appears in the above-identified patent and that said Letters Patent are hereby corrected as shown below:

The term of this patent subsequent to November 27, 1990, has been disclaimed.

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*